United States Patent Office 2,733,794
Patented Feb. 7, 1956

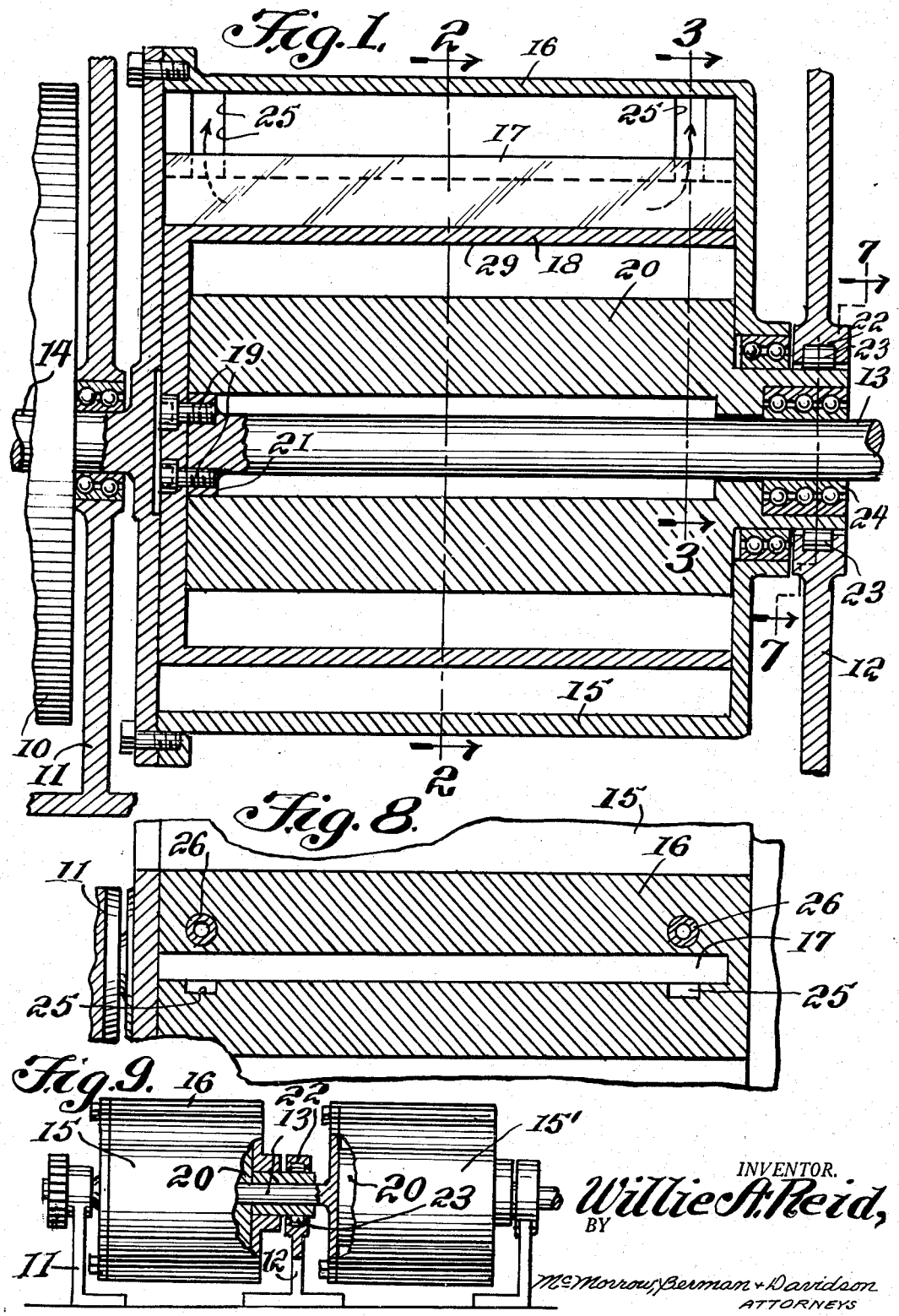

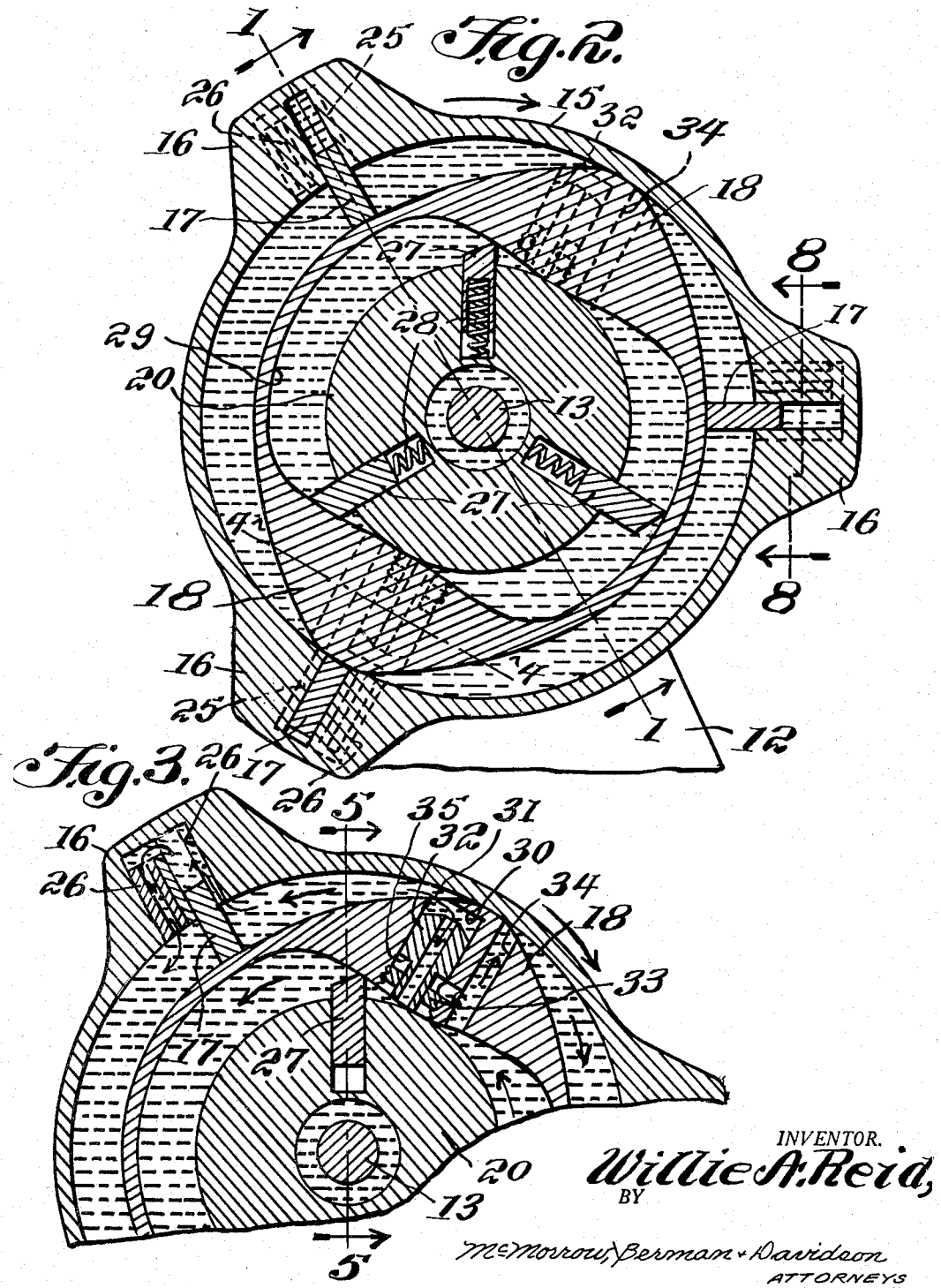

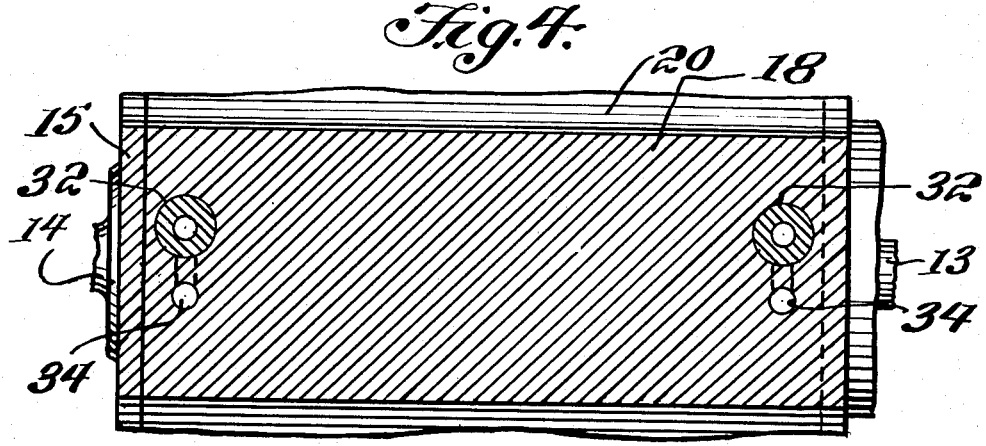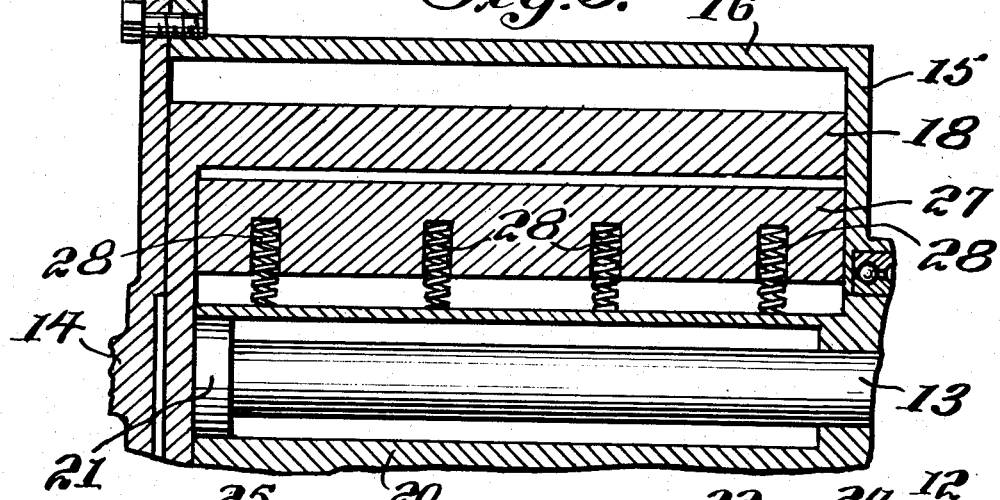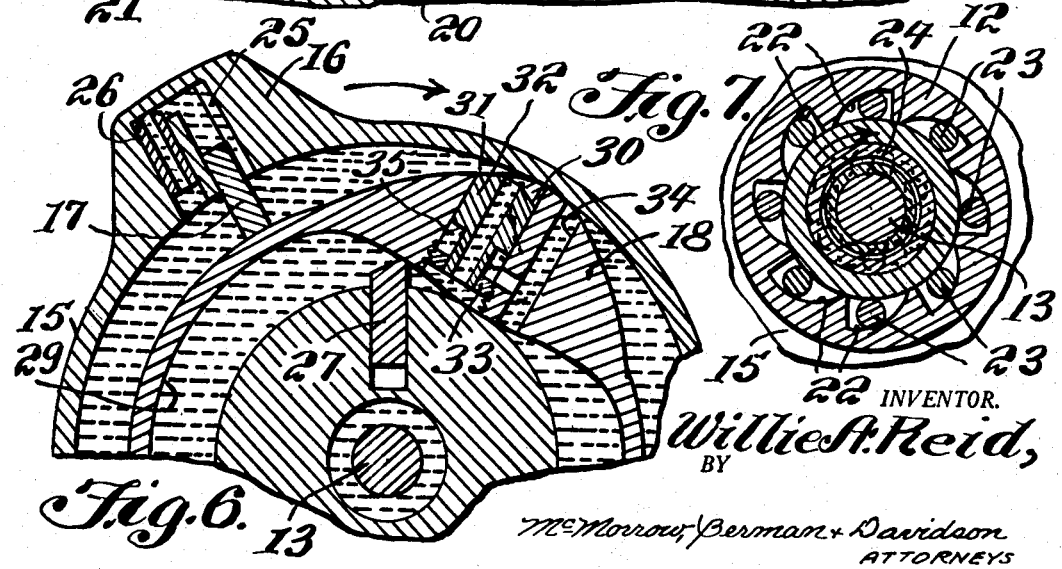

2,733,794

HYDRAULIC COUPLING FOR USE BETWEEN A DRIVING AND A DRIVEN ELEMENT

Willie A. Reid, San Francisco, Calif.

Application January 11, 1955, Serial No. 481,112

3 Claims. (Cl. 192—58)

The present invention relates to a hydraulic coupling for use between a driving and a driven element for providing a new method of connecting such elements so that the driving element may be rotated at a constant speed when idling and with an increase of speed the driven element gradually comes up to speed.

The primary object of the present invention is to provide a hydraulic coupling for use with automotive vehicles and the like for attachment to the drive shaft to provide a smooth and gradual torque converter for applying the power of the engine to the wheels of the vehicle.

Another object of the present invention is to provide an automatically operated fluid coupling for an automotive vehicle of few but sturdy parts having centrifugally operated valves which permit the power of the vehicle to be transmitted to the wheels in a gradually increasing manner as the engine of the vehicle is speeded up.

A further object of the present invention is to provide a hydraulic coupling for connecting a drive shaft to a driven shaft, and having multiple action automatically set into action by the speed of the driven shaft.

A still further object of the present invention is to provide a coupling for a drive shaft and a driven shaft which may be connected in tandem with a similar coupling, and one of high torque converting efficiency, automatic in operation, and one easy to assemble.

These and other objects and advantages of the present invention will be fully apparent from the following description when taken in connection with the annexed drawings, in which:

Figure 1 is a side view in cross-section on line 1—1 of Figure 2,

Figure 2 is an end view in cross-section on line 2—2 of Figure 1,

Figure 3 is a partial view in cross-section on line 3—3 of Figure 1,

Figure 4 is a partial side view on line 4—4 of Figure 2,

Figure 5 is a partial view in cross-section on line 5—5 of Figure 3,

Figure 6 is a similar view to that of Figure 3 showing the valves in a closed position, Figure 7 is an end view on line 7—7 of Figure 1, Figure 8 is a partial view in cross-section taken from the side on line 8—8 of Figure 2, and Figure 9 is a side view in elevation showing two of the couplings of the present invention linked to each other in tandem.

Referring in greater detail to the drawing in which like numerals indicate like parts throughout the several views, in Figure 1 the reference numeral 10 indicates an automotive fly-wheel, the reference numeral 11 indicates a portion of the fly-wheel housing, and 12 indicates either another end of the housing or a support for the driven shaft 13.

The drive shaft is indicated at 14 and is connected to one end of a hollow housing 15 which is substantially filled with hydraulic fluid.

Referring to Figure 2, the hollow housing 15 is shown to have three outstanding bosses 16 each of them having a slot opening from the inner wall of the housing in which is reciprocatingly mounted a radially extending extendible and retractable blade 17 having one end connected to the housing 15 and the other end in sliding contact with a rotor 18 on the outer surface thereof.

Referring again to Figure 1 the rotor 18 will be seen to be connected to the driven shaft 13 by means of the bolts 19, the driven shaft 13 extending through the center of a cylindrical rotor 20 which is supported on the shoulder 21 on the end of the driven shaft 13.

The second rotor 20 is separated from the driven shaft 13 to provide a storage space for the hydraulic fluid, there being no passage needed for the transmission of fluid to this space due to the sliding fit of the rotor 20 on the shoulder 21.

Referring to Figure 7, a support 12 is provided with a plurality of arcuately shaped recesses 22 in which the freely rotatable rollers 23 serve as an overrunning clutch, permitting the rotor 20 to rotate in one direction only, that being the same direction of rotation of the rotor 18.

A suitable bearing 24 supports the driven shaft 13 and the one end of the second rotor 20 within the support 12.

Referring to Figures 1 and 2, each of the recesses within the bosses 16 which support the one ends of the blades 17 are provided with a by-pass 25 leading from the forward side of the blade 17 to the rearward side, in which is slidable a restricted valve 26, seen most clearly in Figure 3. The arrows in that figure indicate the direction of the flow of the oil through the by-pass 25 from one side of the blade 17 to the other. In Figure 3 a condition of idling is shown in which the valve 26 is open permitting the hydraulic fluid to flow from one side of the blade 17 to the other without appreciable reaction to the rotor 18.

Referring to Figure 6, a condition of partial speed is shown in which the valve 26 is moved to a closed position as a result of centrifugal force due to the rotation of the housing 15. In this condition, the pressure of the fluid within the bypass 25 forces the blade 17 into sliding contact with the outer surface of the rotor 18.

The second rotor 20 is also provided with a plurality of outwardly extending extendible and retractable blades 27 each of them being biased outwardly by a spring 28 into contact with the wall of the chamber formed within the rotor 18, the wall being indicated by the reference numeral 29.

Referring to Figures 2, 3 and 4, the rotor 18 is seen to be provided with a bore or passage 30 having an opening indicated by the reference numeral 31 and in which is slidable a valve 32 from a position closing the opening 31 to a position at which the passage through the valve 32 connects the space within the housing 15 exterior of the rotor 18 to the chamber formed within the rotor 18 in which the second rotor is disposed.

The bore 30 is seen to be threaded upon its inner end to receive an annular bushing 33 which provides a restricted cross-sectional area to the lower end of the valve 32.

As shown in Figure 3, the valve 32 is in open condition, while in Figure 6 it is shown in a closed position. A by-pass is provided in the rotor 18 indicated by the reference numeral 34 for the passage of fluid from the space around the rotor 20 to the space within the housing 15 exterior of the rotor 18. An orifice is provided between the by-pass 34 and the bore 30 so that the pressure of the fluid entering the bore 30 from the by-pass 34 may assist in closing the valve 32 by pressing upon its under surface indicated in Figure 6 by the reference numeral 35.

The rotor 18 is of oval or irregular shape and a chamber within the rotor 18 is also of irregular shape so that each of the blades 17 and 27 act as fuel pumps within their respective housing and chamber to drive the rotor 18 in a direction indicated by the arrow in Figure 2.

In operation, the housing 15 rotates in the same direction as indicated by the arrow in Figure 2, and when in idling condition, the engine turns the housing at such a rate of speed that the pressure in the hydraulic fluid on the one side of the blade 17 enters the by-pass 25 and travels through the hollow center of the valve 26, at the same time that it enters the opening 31 into the bore 30 and travels through the hollow center of the valve 32 into the space between the rotor 20 and the wall 29 of the chamber formed in the rotor 18.

As the engine of the vehicle speeds up, the valve 26 is acted upon by centrifugal force to close the passage or bypass 25 which increases the pressure to the opening 31 in the bore or passage 30 and permitting the oil to flow into the chamber formed within the rotor 18 on one side of the blades 27.

It will be seen that the passage of the hydraulic fluid or oil through the valve 32 against the blades 27, around the rotor 20 and out through the by-pass 34 to the space around the rotor 18, acts to divide the force of the fluid pressure so that the rotor 18 will revolve in the same direction with the housing 15 but at a slower rate of rotation.

Increased speed of the housing 15 will increase the pressure of the hydraulic fluid and the rotor 18 will retate at a higher speed until the valve 32 is acted upon by centrifugal force to close the opening 31, at which time the full pressure of the hydraulic fluid as forced by the blades 17 against the rotor 18 will cause the rotor 18 to rotate at the same speed as the housing 15.

The overrunning clutch shown in Figure 7 permits the second rotor 20 to rotate along with the rotor 18 when the latter condition is reached, thereby eliminating any possible drag of the blades 27 within the chamber formed by the inner wall 29 of the rotor 18.

In Figure 9, two of the hydraulic couplings of the present invention are shown connected together in tandem, apart from any connection to a flywheel or flywheel housing, as illustrated in Figures 1 to 8.

In such a coupling, illustrated in Figure 9, the drive shaft will impart torque to the driven shaft in any multiple action, depending upon the number of housings 15, 15' used.

While only preferred embodiments of the present invention are shown, it is believed that other embodiments may be made and practiced within the scope of the appended claims without departing from the spirit of the invention.

What is claimed is:

1. A hydraulic coupling comprising a rotatable housing containing a hydraulic fluid and having a drive shaft projecting exteriorly therefrom, an irregularly shaped rotor disposed within said housing, a driven shaft disposed within and connected to said rotor, radially extending extendible and retractable blades within said housing exteriorly of said rotor and connected by one end to said housing for rotation with the latter, each of said blades having the other end in sliding contact with said rotor, said rotor being formed with an irregularly shaped chamber, a second rotor within said chamber, radially extending extendible and retractable blades within said chamber each connected by one end to said second rotor for reciprocal movement relative to said second rotor with the other end of each of said second-named blades in sliding contact with the wall of said chamber, said housing being formed with a by-pass for fluid from one side of each of its associated blades to the other side, a valve in each of said by-passes operable to close said by-pass in response to centrifugal force, said second rotor being formed with bores connecting the space within said housing exteriorly of said rotor with said chamber, and a valve in each of said bores operable to close the latter in response to centrifugal force whereby fluid pumped by the first-named blades rotates said first-named rotor, and means preventing rotation of said second-named rotor in a direction opposite to the rotation of said first-named rotor.

2. A hydraulic coupling comprising a rotatable housing containing a hydraulic fluid and having a drive shaft projecting exteriorly therefrom, an irregularly shaped rotor disposed within said housing, a driven shaft disposed within and connected to said rotor, radially extending extendible and retractable blades within said housing exteriorly of said rotor and connected by one end to said housing for rotation with the latter, each of said blades having the other end in sliding contact with said rotor, said rotor being formed with an irregularly shaped chamber, a second rotor within said chamber, radially extending extendible and retractable blades within said chamber each connected by one end to said second rotor for reciprocal movement relative to said second rotor with the other end of each of said second-named blades in sliding contact with the wall of said chamber, said housing being formed with a by-pass for fluid from one side of each of its associated blades to the other side, a valve in each of said by-passes operable to close said by-pass in response to centrifugal force, said second rotor being formed with bores connecting the space within said housing exteriorly of said rotor with said chamber, a valve in each of said bores operable to close the latter in response to centrifugal force greater than that required to move said first-named valves to the position closing said by-passes whereby fluid pumped by the blades connected to said housing rotates said rotor at one speed when said first-named valves are closed and at a greater speed when said first-named valves and said second-named valves are closed, and means preventing rotation of said second rotor in a direction opposite to the rotation of said first rotor.

3. A hydraulic coupling comprising a rotatable housing containing a hydraulic fluid and having a drive shaft projecting exteriorly therefrom, an irregularly shaped rotor disposed within said housing, a driven shaft disposed within and connected to said rotor, radially extending extendible and retractable blades within said housing exteriorly of said rotor and connected by one end to said housing for rotation with the latter, each of said blades having the other end in sliding contact with said rotor, said rotor being formed with an irregularly shaped chamber, a second rotor within said chamber, radially extending extendible and retractable blades within said chamber each connected by one end to said second rotor for reciprocal movement relative to said second rotor with the other end of each of said second-named blades in sliding contact with the wall of said chamber, said housing being formed with a by-pass for fluid from one side of each of its associated blades to the other side, a valve in each of said by-passes operable to close said by-pass in response to centrifugal force, said second rotor being formed with bores connecting the space within said housing exteriorly of said rotor with said chamber, a valve in each of said bores operable to close the latter in response to centrifugal force greater than that required to move said first-named valves to the position closing said by-passes whereby fluid pumped by the blades connected to said housing rotates said rotor at one speed when said first-named valves are closed and at a greater speed when said first-named valves and said second-named valves are closed, and means restricting rotation of said second rotor to the direction of rotation of said first rotor.

References Cited in the file of this patent

UNITED STATES PATENTS

| | | |
|---|---|---|
| 1,701,903 | Wingquist | Feb. 12, 1929 |
| 2,519,523 | Wenz | Aug. 22, 1950 |
| 2,633,216 | Zak | Mar. 31, 1953 |